(12) United States Patent
Zylberberg et al.

(10) Patent No.: US 10,831,926 B1
(45) Date of Patent: Nov. 10, 2020

(54) PRIVACY PROOF VISUAL SENSOR

(71) Applicant: EMZA VISUAL SENSE LTD, Givatayim (IL)

(72) Inventors: Yoram Zylberberg, Tel Aviv (IL); Elad Baram, Shilat (IL); Tomer Kimhi, Tel Aviv (IL)

(73) Assignee: EMZA VISUAL SENSE LTD, Givatayim (IL)

( * ) Notice: Subject to any disclaimer, the term of this patent is extended or adjusted under 35 U.S.C. 154(b) by 0 days.

(21) Appl. No.: 16/706,872

(22) Filed: Dec. 9, 2019

(51) Int. Cl.
  *G06F 21/62* (2013.01)
  *G06K 9/46* (2006.01)
  *H04N 5/225* (2006.01)
  *G06K 9/00* (2006.01)
  *H04N 5/232* (2006.01)

(52) U.S. Cl.
  CPC ..... *G06F 21/6245* (2013.01); *G06K 9/00362* (2013.01); *G06K 9/46* (2013.01); *H04N 5/2257* (2013.01); *H04N 5/23229* (2013.01)

(58) Field of Classification Search
  CPC .. G06F 21/6245; G06K 9/00362; G06K 9/46; H04N 5/23229; H04N 5/2257
  See application file for complete search history.

(56) References Cited

U.S. PATENT DOCUMENTS

2004/0081338 A1* 4/2004 Takenaka ........... G06K 9/00221
  382/118
2016/0371504 A1* 12/2016 Huang .................... G06F 21/84

* cited by examiner

*Primary Examiner* — Ahmed A Berhan
(74) *Attorney, Agent, or Firm* — Soroker Agmon Nordman

(57) ABSTRACT

A privacy protecting capture device, comprising: a camera; a memory device for storing at least one image captured by the camera; and a processor, the processor executing: a camera interface for receiving a captured image from the camera and storing at least a part of the at least one image in the memory device; an analysis engine for analyzing the at least one image; an output interface for outputting information related to the image; and a controller for activating the analysis engine, and disabling transmission of information that enables reconstruction of the at least one image from the output interface.

24 Claims, 5 Drawing Sheets

PRIVACY PROOF VISUAL SENSOR

TECHNICAL FIELD

The present disclosure relates to capture devices in general, and to a privacy proof visual sensor, in particular.

BACKGROUND

Nowadays many devices and applications comprise and use cameras for multiple applications and uses, including photography, teleconferencing, social networks activities, security, entertainment, or the like. In particular, cameras are contained in and used by mobile devices such as mobile phones, laptops, tablets, or the like.

Among the variety of uses and applications of a camera installed in computerized mobile devices, one important set of uses includes using captured images or video clips for resolving user characteristics, behavior, security or privacy issues, while enhancing the user experience and increasing battery life, for example by using face recognition for granting access, detecting the presence of a human face and dimming the screen brightness when no one is looking, stopping or starting a video based on gaze detection, turning the screen off when someone is looking over a users shoulder, or the like. A different set of uses includes streaming captured images, for example in video chats, broadcasting, or the like.

Once it is enabled to output or even stream from the device images captured by a camera of the device, the possibility arises of using such images for malicious purposes, thus harming the privacy or security of the user or the device. For example, an image captured for the purpose of face recognition can be seized by a malicious party, and used for obtaining access to the device, or to other devices to which the user has access at a later time, or compromising images or videos of the user can be used for malicious intents.

BRIEF SUMMARY

One exemplary embodiment of the disclosed subject matter is a privacy protecting capture device, comprising: a camera; a memory device for storing one or more images captured by the camera; and a processor, executing: a camera interface for receiving a captured image from the camera and storing at least a part of an image in the memory device; an analysis engine for analyzing the at least one image; an output interface for outputting information related to the image; and a controller for activating the analysis engine, and disabling transmission of information that enables reconstruction of the at least one image from the output interface. Within the device, the controller is optionally implemented in hardware logic. Within the device, the controller is optionally hard coded into a chip. Within the device, information optionally comprises up to a predetermined number of bits from a captured image. Within the device, the information optionally comprises a result of analysis of the captured image. Within the device, the controller, camera interface, output interface and any component that accesses the storage device, are optionally hard coded into a chip. Within the device, the controller, camera interface, and output interface are optionally hard coded into a chip, and components that access the memory device, are optionally configurable. Within the device, the controller, camera interface, and output interface are optionally hard coded into a chip, and components that access the memory device, are optionally hard coded but are adapted to utilize different parameter sets. Within the device, the controller, camera interface, output interface and any component that accesses the storage device, are optionally locked after being installed into the chip. Within the device, locking is optionally implemented by an electronic fuse (e-fuse). Within the device, the controller is optionally locked after being installed into the chip. The device is embedded within a laptop or a smartphone. Within the device, the memory device optionally is comprised in the processor. Within the device, parts of code executed by the processor or parameters used by code executed by the processor can optionally be updated. Within the device, the controller is optionally adapted to limit a volume of data output per image. Within the device, the controller is optionally adapted to limit a number of times the image can be accessed.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
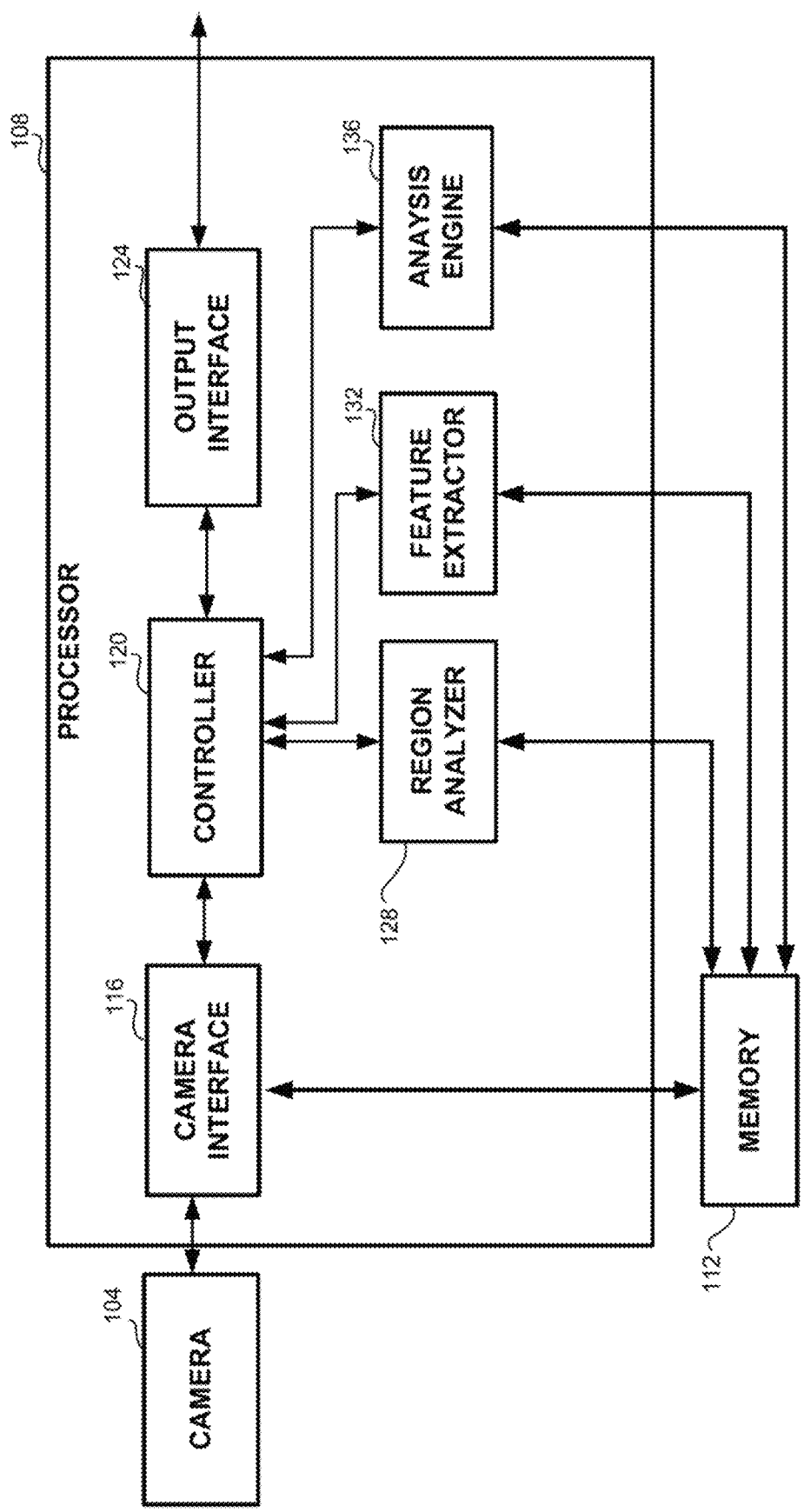
FIG. 1 is a schematic illustration of a capturing system.

Unless specifically stated otherwise, the term "image" used in the specification should be expansively construed to cover any non-destructive capturing of an object, including, but not limited to, capturing by an optical device using any wavelength range(s), including still images, video frames, video clips, or the like.

One technical problem of the disclosure is that computing devices, such as desktop or mobile computing devices, which comprise cameras, are subject to seizing images captured for specific purposes, such as but not limited to security purposes, for malicious purposes.

Thus, the security of a device capable of outputting images and hence the privacy of the user may be compromised, by images captured by the camera for security or enhanced performance purposes being output from the device, hijacked and used for malicious purposes, such as obtaining access to the device or to another device associated with the same user. It will be appreciated that images and video clips used for security purposes can be of high resolution and may thus be more prone for such malicious purposes.

Thus, users may be so concerned about their privacy being compromised, that they may even avoid purchasing laptops with cameras, or shield the camera with opaque material, thus prohibiting the use of the advanced features which are otherwise desired and appealing.

One technical solution comprises disabling the device from outputting images or information that enables reconstruction of images, by governing the main controller of the camera chip, wherein the controller is the only source that can access the camera and provide data to the output interface of the chip. The controller may limit the volume of data that is output per each captured image, so that only a limited number of bits of the image may be output, which are insufficient for reconstructing the image, and in particular in high resolution. Additionally or alternatively, the controller may limit the output to indications provided by of one or more analysis engines, such as an identity of a captured person, number or position of captured persons, or the like.

The output may be limited by etching or hard coding into the camera processor a controller that maintains one or more output limitations, such that the controller cannot be replaced or updated. The controller may be implemented in hardware. Alternatively, the controller may be configurable to the specific unit and specific needs, but locked once installed, using for example an e-fuse mechanism, such that it cannot be replaced or hacked.

Further components of the processor, such as one or more of the camera interface, the output interface, or any of the analysis engines, may also be hard coded and thus configurable once (or another predetermined number of times) or non-replaceable.

It will be appreciated, however, that a mechanism in which all components are hard coded may disable remote software update, which may seriously diminish the functionality of the device. Thus, a capturing and analysis system in accordance with the disclosure needs to allow remote access to the device, including for software update purposes, without allowing access to camera images. This can be achieved by fixating some but not all of the components, while maintaining the output limitations.

In further embodiments, one or more of these components may be hard coded, but may access parameters or other settings which are configurable, such that the behavior of the corresponding component may be changed although the component itself is not changed.

Another technical solution may comprise limiting the volume of data per image which may be output by the output interface. The controller may limit the number of times any one or more components can access the image memory per captured image, such that only a predetermined number of bits can be output. Further attempts by any of the other components to access the image memory, will result in accessing the next captured image, such that the number of bits output of the same image is limited, and is insufficient for reconstructing the image, particularly at high resolution.

Referring now to FIG. 1, showing a schematic exemplary embodiment of a visual sensor, also referred to as a capturing and analysis system, implemented as part of a computing device, such as a mobile phone, a tablet, a laptop, or the like. The capturing and analysis system is adapted to capture images and output data, such that images are not included and cannot be reconstructed from the data.

The capturing and analysis system comprises a capture device such as a camera 104. Camera 104 may be adapted to capture still images, video streams, or the like. The camera may comprise a housing, a lens system, a shutter, and additional components as known in the art.

The capturing and analysis system may comprise processor 108 connected to camera 104, processor 108 comprising components for controlling the camera, analyzing the captured images and outputting the images or the processing results, depending on the application. It will be appreciated that processor 108 is used only by the visual sensor, and is not part of the processing capabilities of the device, Processor 108 can be implemented as one or more processors, such as one or more Central Processing Units (CPU), microprocessors, electronic circuits, Integrated Circuits (IC) or the like. Processor 108 may be configured to provide the required functionality, for example by loading to memory and executing the modules detailed below.

The capturing and analysis system may comprise a memory 112 for storing an image captured by camera 104. As detailed below, an image may be provided to memory 112 by camera interface 116, and accessed by a controller 120 or one or more analysis engines. It will be appreciated that in some situations only a part of the image may be stored, a subsampled image, only features of the image, or the like.

Memory 112 may be implemented as a memory chip, a hard disk drive, a Flash disk, a Random Access Memory (RAM), or the like. Memory 112 may be integral to or separate from the processor's hardware.

It will be appreciated that in some embodiments, memory 112 can be implemented as part of processor 108. However, in other embodiments, memory 112 can be external to processor 108.

Processor 108 may comprise camera interface 116 for receiving an image from camera 104. For example, the image nay be received row-wise, column-wise or the like. Camera interface 116 may store the image in memory 112.

Processor 108 may comprise controller 120, for controlling the parameters of camera 104, through camera interface 116. The camera parameters may be set in accordance with an active application, user selection, or the like. Controller 120 may activate one or more analysis engines as detailed below. The activated components, the activation order, and additional factors may be selected in accordance with the application, the result of other analyses, the specific image, or the like. Controller 120 may receive one or more images, image parts or analysis results, and may provide output to output interface 124. Camera 104 and memory 112 may only be accessed by components of processor 108. Therefore, by limiting the output of processor 108, it is ensured that images cannot be intercepted or hijacked.

Processor 108 may comprise output interface 124, for receiving images, image parts, or analysis results from controller 120 and outputting the same to any application or any need, such as a display, a memory device, further analysis, or the like.

Processor 108 may comprise one or more analysis engines, such as but not limited to the following:

Region analyzer 128 may be adapted to access memory 112 and identify in an image stored therein one or more areas, using for example, motion detection, anomaly detection, illumination changes, edge detection, corner detection, face detection, or the like.

Feature extractor 132 may extract one or more features from the image stored in memory 112, or from a region thereof. Extracted features may include colors, gradients, light level, uniformity, areas, features characterizing a face, a torso, a human body, templates, advanced features such as Scale Invariant Feature Transforms (SIFTs), Speeded-Up Robust Features (SURFs), or other features known in the art of computerized image analysis.

Analysis engine 136 may analyze the image stored in memory 112, and may use information obtained by region analyzer 128 and/or feature extractor 132. Analysis results may relate to but are not limited to any one or more of the following: verifying that a face is captured in the image; verifying an identity of a captured person, determining a number of captured persons, or the like The analysis engines above may receive, for example from controller 120, additional information, such as identity or characteristics of one or more persons to be verified, a maximal number of persons allowed to be in an image, brightness parameters, size parameters, motion parameters, timing parameters, or the like.

In the figures below, one or more components of processor 108 are colored gray, indicating these components are fixed, for example hardwired, and cannot be updated, changed, reconfigured, or the like. The components may be implemented as hardware logic, which cannot be changed at all, i.e., built into the chip during its production process. In further embodiments, as detailed below, one or more of the components may be implemented using an e-fuse, which means that these components can be installed and configured exactly once (or another predetermined number of times) during the installation process or afterwards, after which they are fixed.

Figure 2:
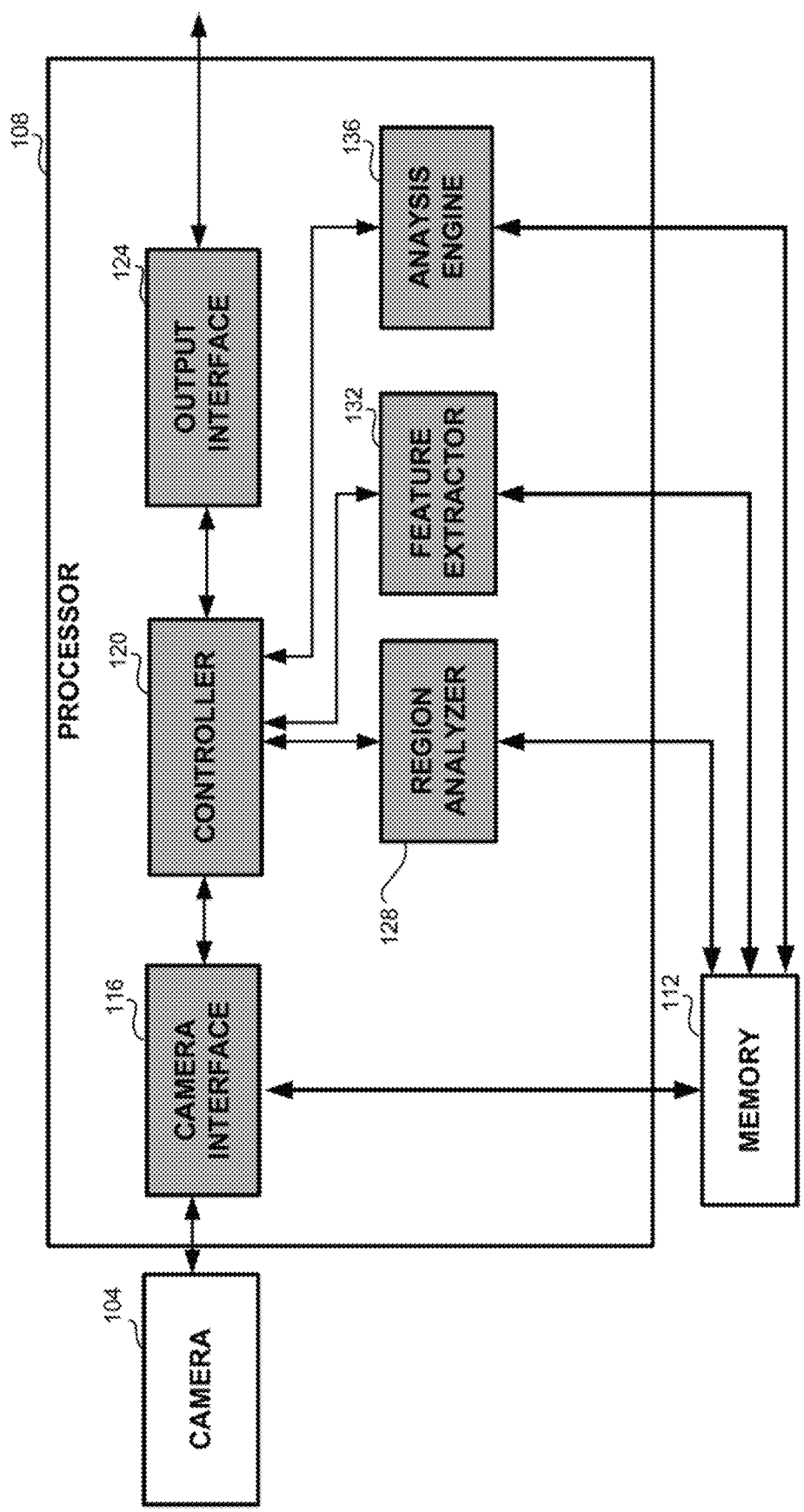
FIG. 2 is a schematic illustration of an embodiment of a capturing system, in accordance with some exemplary embodiments of the disclosed subject matter.

Referring now to FIG. 2, showing a schematic illustration of an embodiment of the capture device of FIG. 1, in accordance with the disclosed subject matter.

FIG. 2 shows the same components as FIG. 1 above, in a fully locked configuration. In this configuration, in order to protect the privacy of a user of the device, the output provided by main controller 120 to output interface 124 is limited by the design of controller 120, such that an image, and particularly an image having high resolution, cannot be transmitted, nor can information that may be sufficient to reconstruct such images. The output may be limited by the type of information provided to controller 120, by the information provided by controller 120 to output interface 124, or the like.

In order to protect the output locking, all components of processor 108 are protected, such that once installed they cannot be updated or reconfigured. For example, all components may be implemented as hardware logic. Thus, the processor is a closed system and no undesired information can be output therefrom. Since there is no other interface enabling access to memory 112, the privacy of the user, as ensured in accordance with the implementation of controller 120 is maintained. However, as detailed above, such configuration disables remote software updates, and thus limits the functionality of the device.

Figure 3:
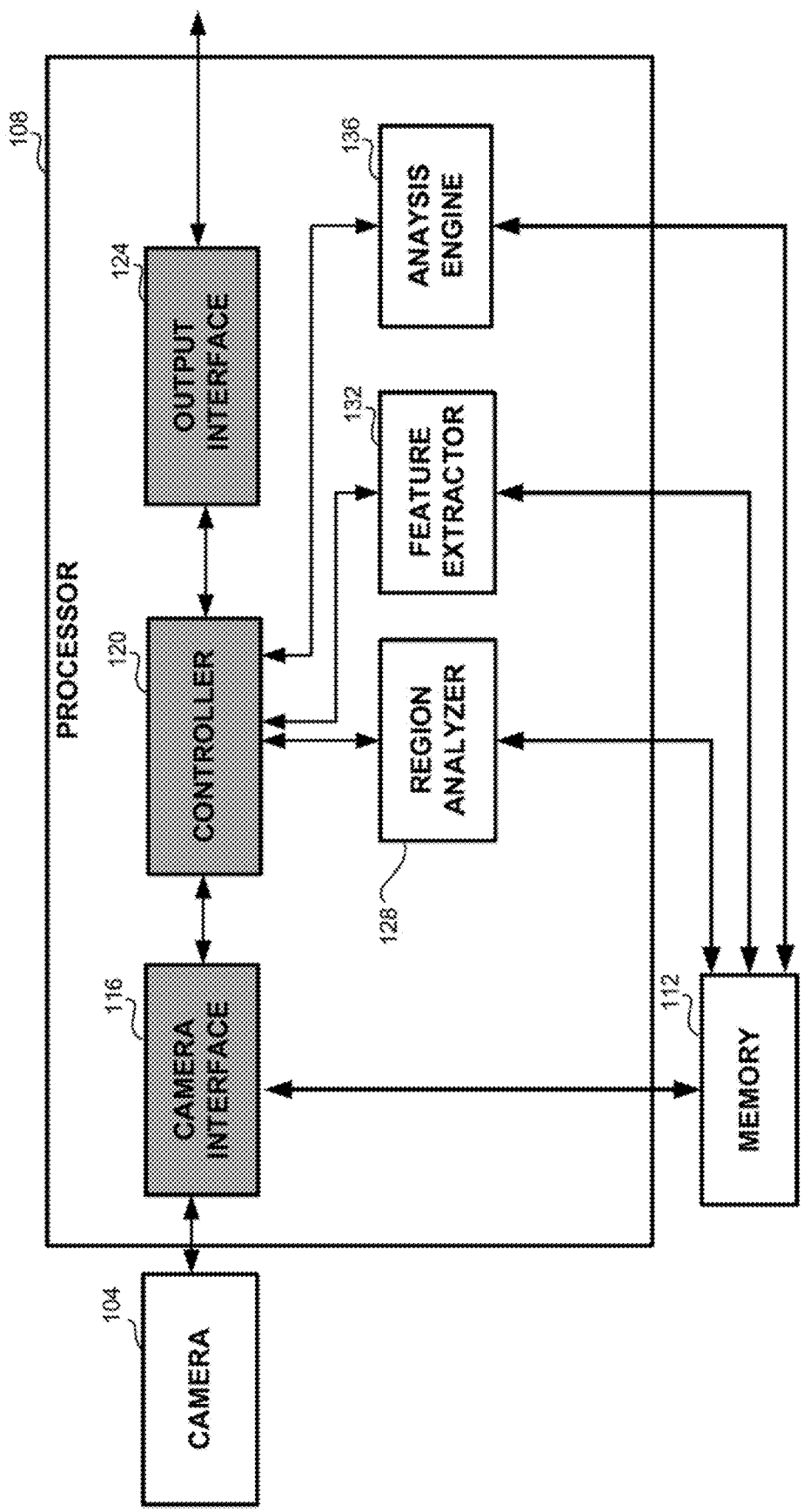
FIG. 3 is a schematic illustration of another embodiment of a capturing system, in accordance with some exemplary embodiments of the disclosed subject matter.

Referring now to FIG. 3, showing a schematic illustration of another embodiment of the capture device of FIG. 1, in accordance with the disclosed subject matter.

In this configuration, referred to as "data flow locking", camera interface 116, controller 120 and output interface 124 are fixed as in FIG. 2 above, while the analysis engines such as region analyzer 128, feature extractor 132 or analysis engine 136, or any parameter used by any of them may be changed. Thus, the algorithm, performance or another behavior of any of the engines may be changed or updated as required. However, the activation sequence of the engines, which is governed by controller 120, is fixed. Additionally, since the data provided to the output interface is governed by controller 120, which implements a constant interface with the engines, no undesired data may be output, regardless of the behavior or performance of the analysis engines.

Figure 4:
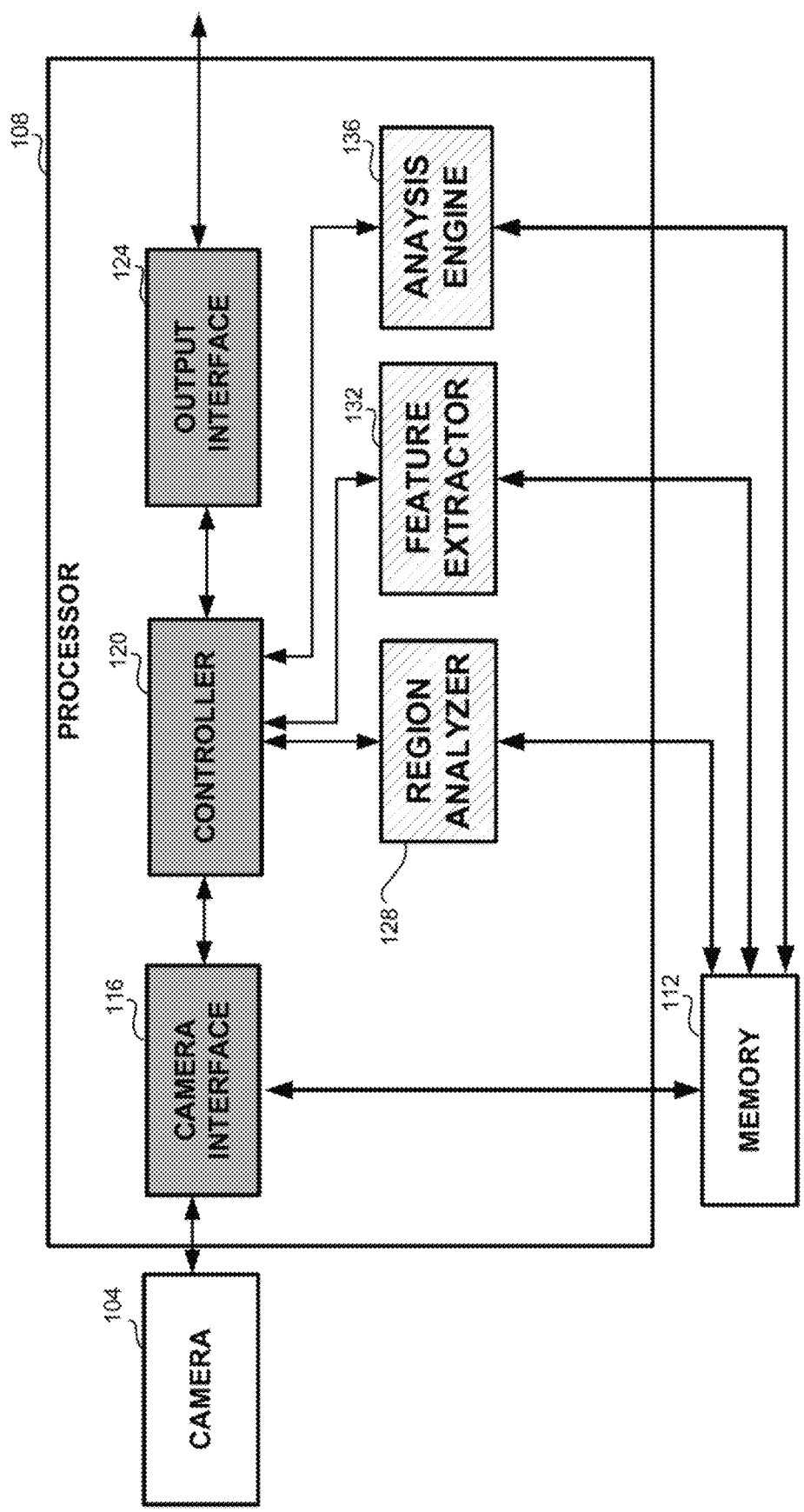
FIG. 4 is a schematic illustration of yet another embodiment of a capturing system, in accordance with some exemplary embodiments of the disclosed subject matter.

Referring now to FIG. 4, showing a schematic illustration of yet another embodiment of the capture device of FIG. 1, in accordance with the disclosed subject matter. In the configuration of FIG. 4, camera interface 116, controller 120 and output interface 124 are fixed as in FIG. 2 above. The analysis engines such as region analyzer 128, feature extractor 132 or analysis engine 136 are fixed, but one or more parameters or parameter sets used by any of these components may be changed. For example, different parameters may be used if it is required to identify people from above or from the side. This option allows for selecting the algorithm, performance or another behavior of any of the engines within predetermined options. As in FIG. 3 above, the activation sequence of the engines, which is governed by controller 120, is constant. Additionally, since the data provided to the output interface is governed by controller 120, which implements a constant interface with the engines, no undesired data may be output, regardless of the behavior or performance of the analysis engines.

Figure 5:
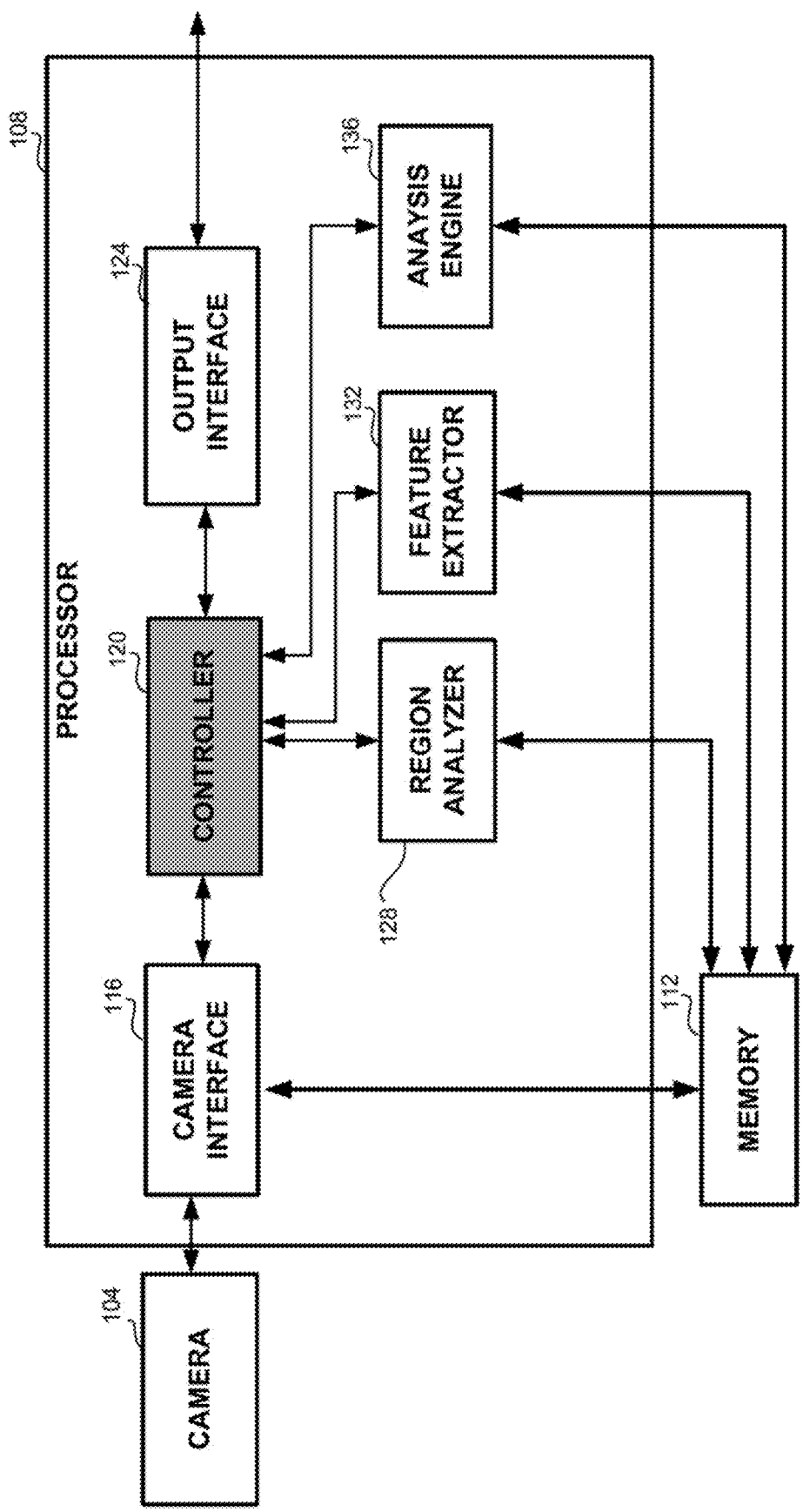
FIG. 5 is a schematic illustration of yet another embodiment of a capturing system, in accordance with some exemplary embodiments of the disclosed subject matter.

Referring now to FIG. 5, showing a schematic illustration of yet another embodiment of the capture device of FIG. 1, in accordance with the disclosed subject matter.

In the configuration of FIG. 5, referred to as "output coupling", at least controller 120 cannot be replaced, thus fixating the interface with output interface, and then the output of processor 108. Thus, even if memory 112 or any other component is hijacked, no sufficient amount of useful information can be output and used for malicious purposes.

In a further configuration, referred to as "on-site locking", one or more of the components, for example only controller 120, controller 120 and interfaces 116 and 124, or all components, may be installed and then configured or reconfigured a predetermined number of times, for example once. Such installation and configuration may use a mechanism of e-fuse (also referred to as eFuse). While computer logic is generally "etched" or "hard-coded" onto a chip and cannot be changed once the chip has finished being manufactured or deployed, by utilizing one or more e-fuses, a chip manufacturer can allow for dynamic real-time reprogramming of a component of the chip, for example after being installed when specific aspects of its operation become known, by blowing an e-fuse. An e-fuse may be used for configuring the behavior of a logic circuit being a part of a chip, by setting up default values for registers, or directly controlling the logic. An e-fuse has an initial value, for example 0 or 1, which changes once the fuse is burnt, for example following a programming phase. Subject to burning, the behavior may be changed, and remains that way.

A configuration using an e-fuse may be useful for adapting the components, including the analysis engines, to the required functionality, for example in accordance with the device being installed. Thus, a multiplicity of different devices may be manufactured and installed with the same processor, after which each such device may be configured and fixated to provide the desired behavior and features, which then cannot be modified.

It will be appreciated that the above embodiments are exemplary only, and that multiple other embodiments may be designed. In each such embodiment, one or more components can be fixed, replaceable, or fixed but using changeable parameters or parameter sets, while the limitations incurred by the controller on the amount of data that can be output from the processor, is maintained and cannot be worked around.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as Python, MATLAB, the "C" programming language or similar programming languages. The computer readable program instructions may execute entirely on the user's computer, partly on the user's computer, as a stand-alone software package, partly on the users computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A privacy protecting capture device, comprising:
    a camera;
    a memory device for storing at least one image captured by the camera; and
    a processor, executing:
        a camera interface for receiving a captured image from the camera and storing at least a part of the at least one image in the memory device;
        an analysis engine for analyzing the at least one image;
        an output interface for outputting information related to the at least one image; and
        a controller for activating the analysis engine, the controller adapted to limit an amount of data output per the at least one image, thereby disabling transmission of information that enables reconstruction of the at least one image from the output interface.

2. The device of claim 1, wherein the controller is implemented in hardware logic.

3. The device of claim 1, wherein the controller is hard coded into a chip.

4. The device of claim 1, wherein the information comprises up to a predetermined number of bits from the at least one image.

5. The device of claim 1, wherein the information comprises a result of analysis of the at least one image.

6. The device of claim 1, wherein the controller, camera interface, output interface and any component that accesses the storage device, are hard coded into a chip.

7. The device of claim 1, wherein the controller, camera interface, and output interface are hard coded into a chip, and wherein components that access the memory device, are configurable.

8. The device of claim 1, wherein the controller, camera interface, and output interface are hard coded into a chip, and wherein components that access the memory device, are hard coded but are adapted to utilize different parameter sets.

9. The device of claim 8, wherein locking is implemented by an electronic fuse (e-fuse).

10. The device of claim 1, wherein the controller, camera interface, output interface and any component that accesses the storage device, are locked after being installed into the chip.

11. The device of claim 1, wherein the controller is locked after being installed into the chip.

12. The device of claim 1, wherein the device is embedded within a laptop or a smartphone.

13. The device of claim 1, wherein the memory device is comprised in the processor.

14. The device of claim 1, wherein parts of code executed by the processor or parameters used by code executed by the processor can be updated.

15. A privacy protecting capture device, comprising:
    a camera;
    a memory device for storing at least one image captured by the camera; and
    a processor, executing:
        a camera interface for receiving a captured image from the camera and storing at least a part of the at least one image in the memory device;
        an analysis engine for analyzing the at least one image;
        an output interface for outputting information related to the at least one image; and
        a controller for activating the analysis engine, wherein the controller is adapted to limit a number of times the at least one image can be accessed, thereby disabling transmission of information that enables reconstruction of the at least one image from the output interface.

16. The device of claim 15, wherein the controller is implemented in hardware logic or hard coded into a chip.

17. The device of claim 15, wherein the information comprises up to a predetermined number of bits from the at least one image.

18. The device of claim 15, wherein the controller, camera interface, output interface and any component that accesses the storage device, are hard coded into a chip.

19. The device of claim 15, wherein the controller, camera interface, and output interface are hard coded into a chip, and wherein components that access the memory device, are configurable.

20. A privacy protecting capture device, comprising:
    a camera;
    a memory device for storing at least one image captured by the camera; and
    a processor, executing:
        a camera interface for receiving a captured image from the camera and storing at least a part of the at least one image in the memory device;
        an analysis engine for analyzing the at least one image;
        an output interface for outputting information related to the at least one image; and
        a controller for activating the analysis engine, the controller adapted to limit types of data output per the at least one image, thereby disabling transmission of information that enables reconstruction of the at least one image from the output interface.

21. The device of claim 20, wherein the controller is implemented in hardware logic or is hard coded into a chip.

22. The device of claim 20, wherein the information comprises a result of analysis of the at least one image.

23. The device of claim 20, wherein the controller, camera interface, output interface and any component that accesses the storage device, are hard coded into a chip.

24. The device of claim 20, wherein the controller, camera interface, and output interface are hard coded into a chip, and wherein components that access the memory device, are configurable.

* * * * *